United States Patent [19]

Hendricks

[11] Patent Number: 4,774,037
[45] Date of Patent: Sep. 27, 1988

[54] METHOD FOR PRODUCING SOLID OR HOLLOW SPHERICAL PARTICLES OF CHOSEN CHEMICAL COMPOSITION AND OF UNIFORM SIZE

[75] Inventor: Charles D. Hendricks, Livermore, Calif.

[73] Assignee: The United States of America as represented by the United States Department of Energy, Washington, D.C.

[21] Appl. No.: 911,847

[22] Filed: Sep. 26, 1986

[51] Int. Cl.⁴ .......................... B29B 9/10; C03B 19/10
[52] U.S. Cl. .......................................... 264/9; 65/21.2; 65/21.4; 75/0.5 C; 264/10
[58] Field of Search ................. 264/9, 10, 5; 75/0.5 C; 65/21.1, 21.2, 21.4

[56] References Cited

U.S. PATENT DOCUMENTS

| | | |
|---|---|---|
| 2,398,455 | 4/1946 | Unger . |
| 2,881,092 | 4/1959 | Sedlacsik . |
| 3,275,787 | 9/1966 | Newberry . |
| 3,579,721 | 5/1971 | Kaltenbach . |
| 3,706,543 | 12/1972 | Thuler .................................. 65/105 |
| 3,963,812 | 6/1976 | Schlienger ............................ 264/8 |
| 3,975,184 | 8/1976 | Akers ................................. 75/0.5 B |
| 4,036,568 | 7/1977 | Morlet et al. .......................... 425/8 |
| 4,044,936 | 8/1977 | Obersby . |
| 4,248,369 | 2/1981 | Clausen . |
| 4,264,641 | 4/1981 | Mahoney et al. ...................... 427/30 |
| 4,303,431 | 12/1981 | Torobin ............................... 65/21.4 |
| 4,336,338 | 6/1982 | Downs et al. ......................... 501/12 |
| 4,415,512 | 11/1983 | Torobin ................................. 264/9 |
| 4,431,137 | 2/1984 | Prewett et al. ..................... 75/0.5 C |
| 4,449,901 | 5/1984 | Wang et al. ............................ 425/6 |
| 4,467,171 | 8/1984 | Ramos ........................... 219/121 LG |
| 4,472,513 | 9/1984 | Menger-Hammond et al. ........ 502/5 |
| 4,474,604 | 10/1984 | Nakamura et al. ................. 75/0.5 B |
| 4,482,375 | 11/1984 | Sastry et al. ...................... 75/0.5 C |
| 4,540,629 | 9/1985 | Sands et al. .......................... 428/402 |

OTHER PUBLICATIONS

Calliger et al. "Hollow drop production by injection of gas bubbles into a liquid jet" Rev. Sci. Instrum., vol. 48, No. 7, Jul. 1977.
Zeleny, "Instability of Electrified Liquid Surfaces" The Physical Review, Second Series, Jul. 1917, vol X, No. 1 pp. 1–6.

Primary Examiner—Jan H. Silbaugh
Assistant Examiner—Mary Lynn Fertig
Attorney, Agent, or Firm—Gary Roth; L. E. Carnahan; Judson R. Hightower

[57] ABSTRACT

A method is provided for producing commercially large quantities of high melting temperature solid or hollow spherical particles of a predetermined chemical composition and having a uniform and controlled size distribution. An end (18, 50, 90) of a solid or hollow rod (20, 48, 88) of the material is rendered molten by a laser beam (14, 44, 82). Because of this, there is no possibility of the molten rod material becoming contaminated with extraneous material. In various aspects of the invention, an electric field is applied to the molten rod end (18, 90), and/or the molten rod end (50, 90) is vibrated. In a further aspect of the invention, a high-frequency component is added to the electric field applied to the molten end of the rod (90). By controlling the internal pressure of the rod, the rate at which the rod is introduced into the laser beam, the environment of the process, the vibration amplitude and frequency of the molten rod end, the electric field intensity applied to the molten rod end, and the frequency and intensity of the component added to the electric field, the uniformity and size distribution of the solid or hollow spherical particles (122) produced by the inventive method is controlled. The polarity of the electric field applied to the molten rod end can be chosen to eliminate backstreaming electrons, which tend to produce run-away heating in the rod, from the process.

10 Claims, 3 Drawing Sheets

METHOD FOR PRODUCING SOLID OR HOLLOW SPHERICAL PARTICLES OF CHOSEN CHEMICAL COMPOSITION AND OF UNIFORM SIZE

BACKGROUND OF THE INVENTION

The United States Government has rights in this invention pursuant to Contract No. W-7405-ENG-48 between the U.S. Department of Energy and the University of California for the operation of the Lawrence Livermore National Laboratory.

The invention described herein relates generally to methods for producing spherical particles, and more particularly to methods for producing solid or hollow spherical particles of uniform size that are made of high-melting temperature materials including refractories, metals, glasses, polymeric materials and other compounds and mixtures.

As described by Zeleny, Phys. Rev. 10, 1 (1917), an electric field applied to the surface of a liquid can distort the fluid surface and cause the ejection of charged droplets or even, as later discovered, multiatomic particles or single atoms. This effect is caused by the electric field producing forces which interact on the material additionally with the gravity forces, internal molecular and atomic binding forces, and surface tension forces that are normally present in any liquid. The forces interact to form a dynamic pressure distribution on the surface of the liquid that is functional of the local radius of curvature of the fluid surface. Small quantities of the liquid are forced to flow into regions within which the local radius of curvature is impelled to rapidly diminish, and are ejected from the fluid surface as droplets. It is very difficult, if not impossible, to control precisely the size distribution of the particles produced by this method. This technique is very well-known and, to name a few of its applications, has been used in printing, ion etching, pattern deposition and ion implantation.

Early activity in the art of particle production was carried out using media that are liquid at normal room temperature, such as water, ink, glycerol and mercury. In later applications, as exemplified by the teaching of Mahoney et al in U.S. Pat. No. 4,264,641 issued Apr. 28, 1981, metal droplets have been formed by the application of an intense electric field to the liquid surface of molten metal. In Mahoney et al the metal is melted by a crucible heater and placed in a refractory reservoir, from which it is drawn into a refractory nozzle that terminates in a short capillary tip. when the molten charge approaches the nozzle tip, it enters a region of intense electric field established by the application of high positive voltage to the nozzle. The electric field is maintained between the positive nozzle and an extractor electrode that is held at a negative potential. Both the molten metal surface and the nozzle tip are bombarded by backstreaming electrons emitted from the extractor electrode. Additional backstreaming electrons can be emitted from the extracted metal droplets themselves, under the influence of the high electric field, or from small plasmas that are formed when the charged metal droplets are electric field accelerated and impact on downstream collection surfaces. Backstreaming electrons heat the molten metal surface and create a runaway condition wherein the heating process is not under control. However, in some applications, negatively biased thermionic electron emitters have been specifically used to provide electrons to heat the metal surface and keep it molten during high electric field particle extraction. Nevertheless, where uncontrolled backstreaming electrons are present, as is often the case, they can heat and melt the nozzle tip itself, even though it be made of a refractory ceramic or some other high-melting-point material such as stainless steel. When this happens, the material of the nozzle tip intermixes with and contaminates the metal droplets which the process is seeking to produce.

Work by Calliger et al, Rev. Sci. Instrum. 48, 846 (1977), has resulted in a methodology for the production of hollow liquid drops. Dual capillary nozzles are used to inject a gaseous jet into a liquid jet. In some applications the dual capillary nozzles may be comprised of concentric tubes, or partially blocked circular holes in plates. The gas jet is broken up into uniform bubbles by acoustical excitation, and the bubbles then break up the fluid jet into uniform spheres. Since the spheres contain the bubbles, they are in fact hollow shells. If the liquid used in this process has a high melting point, such as have copper or gold, the dual capillary nozzles must be made of materials that do not melt and are structurally reliable at working temperatures. Also, the orifices of the dual capillary nozzles must not be eroded or dissolved by the high temperature molten materials forced therethrough. These requirements severely limit the usefulness of this methodology.

It is thus apparent tnat there presently does not exist any adequate method for producing solid or hollow high-melting spherical particles having a uniform size and in appreciable quantities. This is very unfortunate in view of the present industrial need for large quantities of such particles. For example, the petroleum industry presently uses extremely large quantities of small particles of platinum, palladium and other materials having a large surface to volume ratio, as cracking catalysts in the production or refining of high-octane gasoline and other quality petroleum products. The size distribution and purity of these catalysts control the speed, the specific output, and consequently the cost, of the refining process. Petroleum catalysts are presently very expensive, because of production and material costs, and are very deficient in respect to purity and size uniformity. The economical availability of commercially large quantities of spherical particles of these and other particulate materials having uniformly controlled size and surface to volume ratios, would permit both a greatly improved control of the refining process itself, resulting in the production of increased quantities of high-quality petroleum products rather than lower-quality by-products, as well as a greater utilization of the costly catalyst material itself, a considerable portion of which is wasted in present industrial practices.

SUMMARY OF THE INVENTION

It is, therefore, an object of the invention to provide an economical method for producing commercially large quantities of high melting temperature, solid or hollow spherical particles of a predetermined chemical composition and having a uniform and controlled size distribution.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the method of this invention may comprise introducing the end of a solid, or hollow and internally pressurized, rod into a focused beam of laser light that has enough power to melt the rod material. This material may have a low to a very high melting temperature. when the molten end of the rod is subjected to both vibration and the application of an electric field, solid or hollow spherical particles, consisting of the rod material, are ejected from the melted end of the solid or hollow rod, respectively. It is often preferable to carry out this method in a controlled environment, such as in a vacuum or in an inert atmosphere. Also, in situations where backstreaming electrons are sought to be avoided, it is preferred that the applied electric field be directed into the end of the rod. This may be achieved by having the rod at a negative electric potential with respect to its surroundings. Additionally, in some aspects of the inventive method, a high frequency component may be added to the applied electric field to aid in the process of particle extraction and to control size distribution. The size distribution of the solid or hollow particles produced by this method may be controlled by controlling: the internal pressure of the rod when it is hollow; the rate at which the rod is introduced into the focused laser beam; the process environment; the amplitude and frequency of vibration of the end of the rod; the intensity of the applied electric field; and the frequency and intensity of any high-frequency component added to the applied electric field. Large quantities of solid or hollow spherical particles may be economically provided by this method.

In accordance with the present invention, when the end of a solid rod is melted by laser light, and an electric field is applied to that end, solid spherical particles of the rod material will be ejected from the molten material, even without vibrating the molten end of the rod. However, the uniformity of the size distribution of the ejected particles will be improved if the molten end of the rod is vibrated, and consequently this procedure is often preferred. In which situation, the preferred method of carrying out the vibration is by either piezoelectric or magnetostrictive means. Also, vibrating devices such as audio speakers or gas driven sonic generators or whistles may be employed.

It is further in accordance with the objects and purposes of the present invention, that when the end of a hollow and internally pressurized rod is melted by laser light, and the melted end is vibrated, preferably by piezoelectric or magnetostrictive means, or by vibrating devices such as audio speakers or gas driven sonic generators or whistles, hollow spherical particles of the rod material will be produced from the molten material, even without the application of an electric field to the molten end of the rod. These hollow spherical particles will tend to have relatively large dimensions. To reduce the size of the hollow spherical particles that are produced by this inventive method, it is often preferred to apply an electric field to the molten end of the rod.

The benefits and advantages of the present invention, as embodied and broadly described herein, include, inter alia, the provision of an economical method for producing commercially large quantities of high melting temperature solid or hollow spherical particles of a predetermined chemical composition and having a uniform and controlled size distribution.

BRIEF DESCRIPTION OF THE DRAWINGS

The accompanying drawings, which are incorporated in and form a part of the specification, illustrate three related embodiments of the invention and, together with the description, serve to explain the principles of the invention. In the drawings.

DETAILED DESCRIPTION OF THE INVENTION

Reference will now be made in detail to the present preferred embodiment of the invention, an example of which is illustrated in the accompanying drawings. A very important part of the present invention resides in the utilization of laser light to heat and render molten high-melting-point materials such as refractories, metals and glasses. Because of this, solid or hollow rods of these materials can be easily stored and manipulated, without the need of elaborate crucible heaters and reservoirs, refractory nozzles and capillary tips, and the like, prior to their being selectively and locally melted in a very controlled manner, as required. Additionally, the method of this invention will work with lower melting point materials such as polymers, waxes, and so forth.

Figure 1:
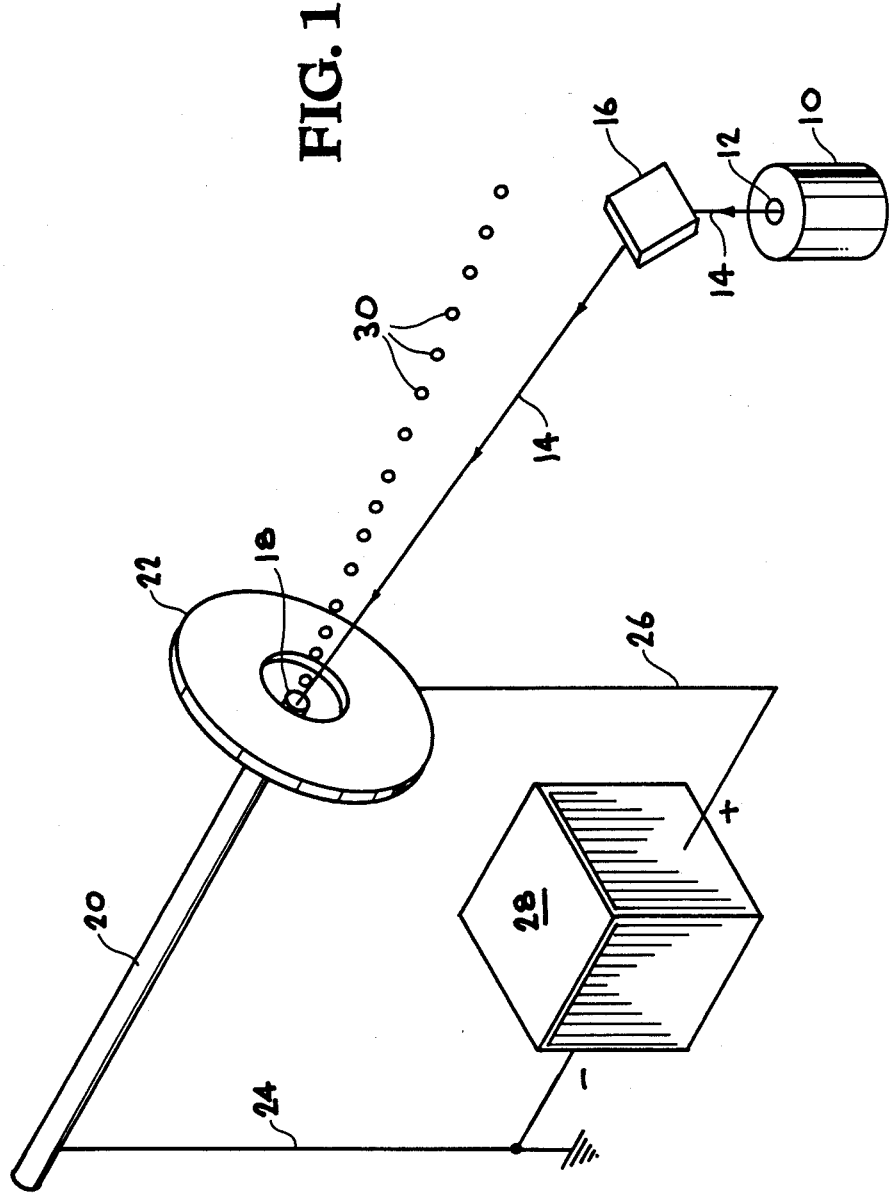
FIG. 1 is a schematic perspective view of an embodiment of apparatus for producing solid spherical particles in accordance with the method of this invention.

Reference is first made to FIG. 1 which is a schematic and perspective view of apparatus for producing solid spherical particles in accordance with the method of the invention. A laser 10, equipped with a focusing element 12, produces a focused beam of laser light 14. Laser 10 may be CW or pulsed, and may be of virtually any type such as $CO_2$, nitrogen, argon ion, YAG or DYE. Laser 10 may have any wavelength that is not totally reflective on the particle material employed. Laser 10 must have a power level high enough so that the average power absorbed by the particle material will melt the material. This will usually vary from a few watts to several hundreds of watts. Laser light beam 14 may be reflected and redirected by any convenient and appropriate means such as, for example, by mirror 16 which is schematically represented. An end 18 of a solid rod 20 is shown as introduced into laser beam 14 which has sufficient power to melt the rod material. Solid rod 20 may consist of materials such as refractories, metals, glasses, polymeric materials and other compounds and mixtures such as various inorganic salts. Rod 20 may have dimensions such as diameters in the approximate range from about 0.010 inch to 0.25 inch, and any lengths in excess of about 1.0 centimeter. Rod materials are stated herein to be of chosen chemical composition because spherical particles consisting of the same material, without externally introduced contaminants, are going to be produced therefrom. Of course, if one starts with a rod consisting of any heterogeneous conglomeration of materials, the method of this invention will provide spherical particles consisting of the same heterogeneous conglomeration of materials. It is in this sense of sameness that the materials are described as being of a chemically chosen composition. Solid rod 20 is electrically connected to an electrode 22, which is schematically shown as an annular disk, via a first conductor 24 and a second conductor 26 that are each also attached to power supply 28. Conductor 24 is grounded, as shown. Power supply 28 may be any D.C. power supply rated from 0 to 100 kV and up to 20 ma. Such power supplies are very well-known and extensively used in the electronic arts. with the polarity shown, power supply 28 causes solid rod 20 to be at a negative electrical potential with respect to electrode 22, so that an electric field is produced that is directed into rod end 18. It is recalled from elementary physics that the direction of an electric field at a point in space is the same as the direction of the force that the electric field would produce on a positive test charge that was placed, at rest, at the point in space. Since a positive test charge would be attracted toward negatively biased rod end 18, the electric field produced by power supply 28 is directed into rod end 18. It is further recalled from elementary physics that the direction of an electric field at a point just outside the surface of a charged conductor is always perpendicular to the surface at that point. The electric field established by power supply 28 and electrode 22, at the molten surface of rod end 18, should be in the range extending up to approximately $10^8$ volts per meter. This electric field will cause the ejection of solid spherical particles 30, consisting of material of the same chemical composition as solid rod 20, from molten rod end 18. Note that free electrons will not be attracted toward rod end 18 because of its negative electrical bias. However, in other embodiments of the invention that are similar to the one shown in FIG. 1 except for having a power supply of reversed electrical polarity, so that an electric field is produced that is directed out of the molten surface of the end of the rod, even though spherical particles similar to particles 30 will be produced, electrons will now be attracted to, and tend to backstream toward, the molten end surface of the rod. Even though these electrons will tend to heat the rod, they will not contaminate it because there are no extraneous materials either adjacent to or in the immediate vicinity of the rod tip.

Figure 2:
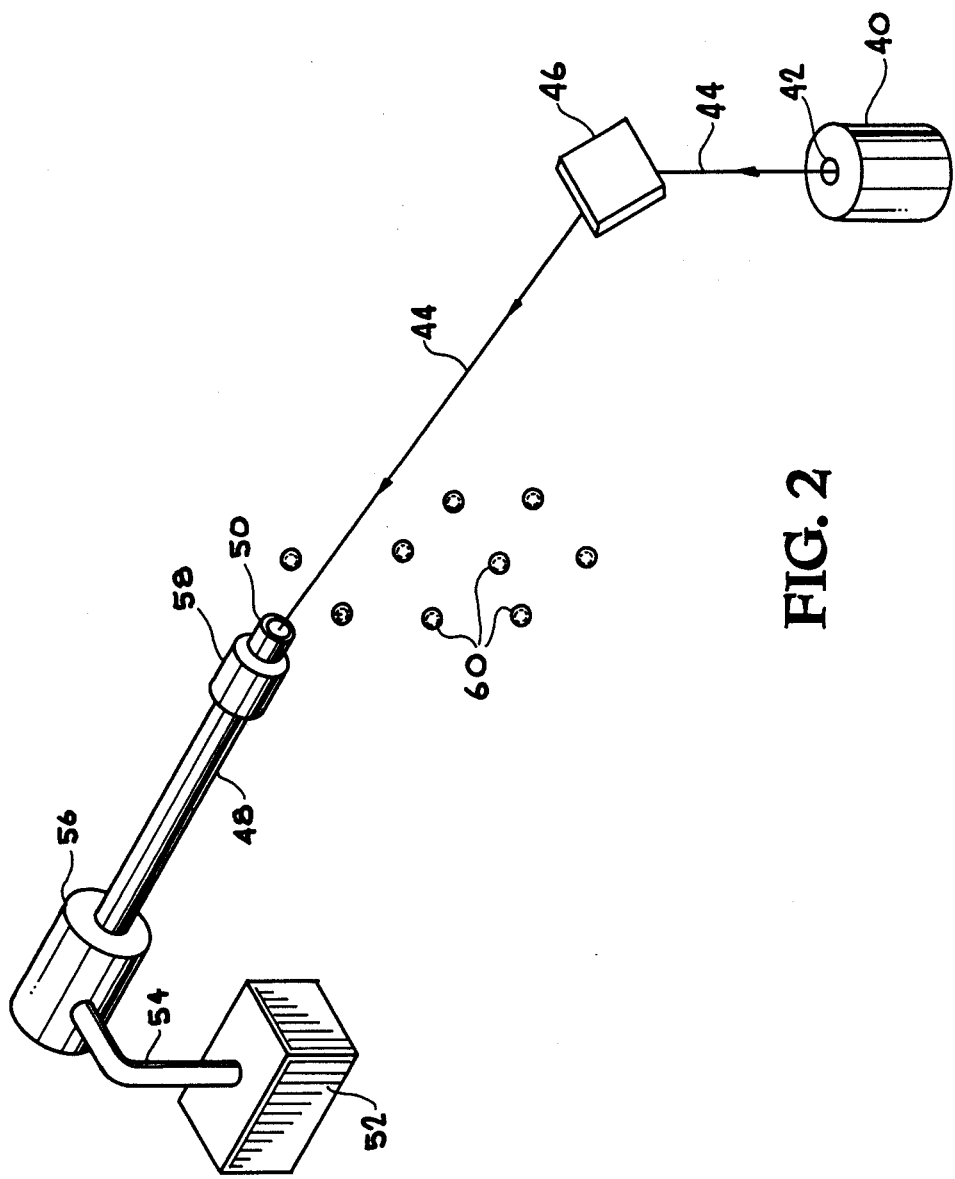
FIG. 2 is a schematic perspective view of an embodiment of apparatus for producing hollow spherical particles in accordance with the method of this invention.

Reference is now made to FIG. 2 which is a schematic and perspective view of apparatus for producing hollow spherical particles in accordance with the method of the invention. A laser 40, equipped with a focusing element 42, produces a focused beam of laser light 44. Laser 40 is the same type of laser as laser 10 of FIG. 1, and the description of laser 10, supra, is equally applicable to laser 40. Laser light beam 44 may be reflected and redirected by any convenient and appropriate means such as, for example, by a mirror 46 which is schematically represented. A hollow rod 48 having an end 50, is shown as introduced into laser beam 44, which has sufficient power to melt the rod material. Hollow rod 48 may consist of materials such as refractories, metals, glasses, polymeric materials and other compounds and mixtures such as various inorganic salts. Rod 48 may have any length, as desired, and almost any diameters, although outside diameters in the approximate range from 3 to 5 millimeters with inside diameters in the approximate range from 0.5 to 2 millimeters are typical. The interior of hollow rod 48 must be pressurized to keep rod 48 from collapsing during the process of hollow particle production. Pressurization is accomplished by a pressure source 52 and a connecting tube 54, which introduces pressurized gas into a rod support 56 where the gas is introduced into hollow rod 48. These elements are schematically depicted, and represent any commercial or technical process for introducing a pressurized gas into an object. The number of these well-known commercial or technical pressurization processes is legion. The gas used in the process is usually inert. The end 50 of rod 48 is vibrated by a vibrator 58. Preferably, vibrator 58 is either a piezoelectric vibrator or a magnetostrictive vibrator. Vibrators such as vibrator 58 are very well-known in the mechanical, electrical and chemical arts and are commercially available from many sources such as Channel Industries, Inc. of Santa Barbara, Vibrator 58 may also be a vibrating device such as an audio speaker or a gas driven sonic generator or whistle. As internally pressurized hollow rod 48 is vibrated by vibrator 58 and introduced into and melted by laser beam 44, the hollow molten material is forced to break up into short sections with both ends closed. Surface tension forces these sections to form into a multiplicity of hollow spherical particles 60. These particles have an external diameter that is larger than the original diameter of hollow rod 48. However, as will be shown below, if a high intensity electric field, provided by means similar to those depicted in FIG. 1, is applied to hollow rod end 50, the molten end of the rod will be elongated to form a hollow jet of small diameter, and very small spherical hollow particles will be formed.

Figure 3:
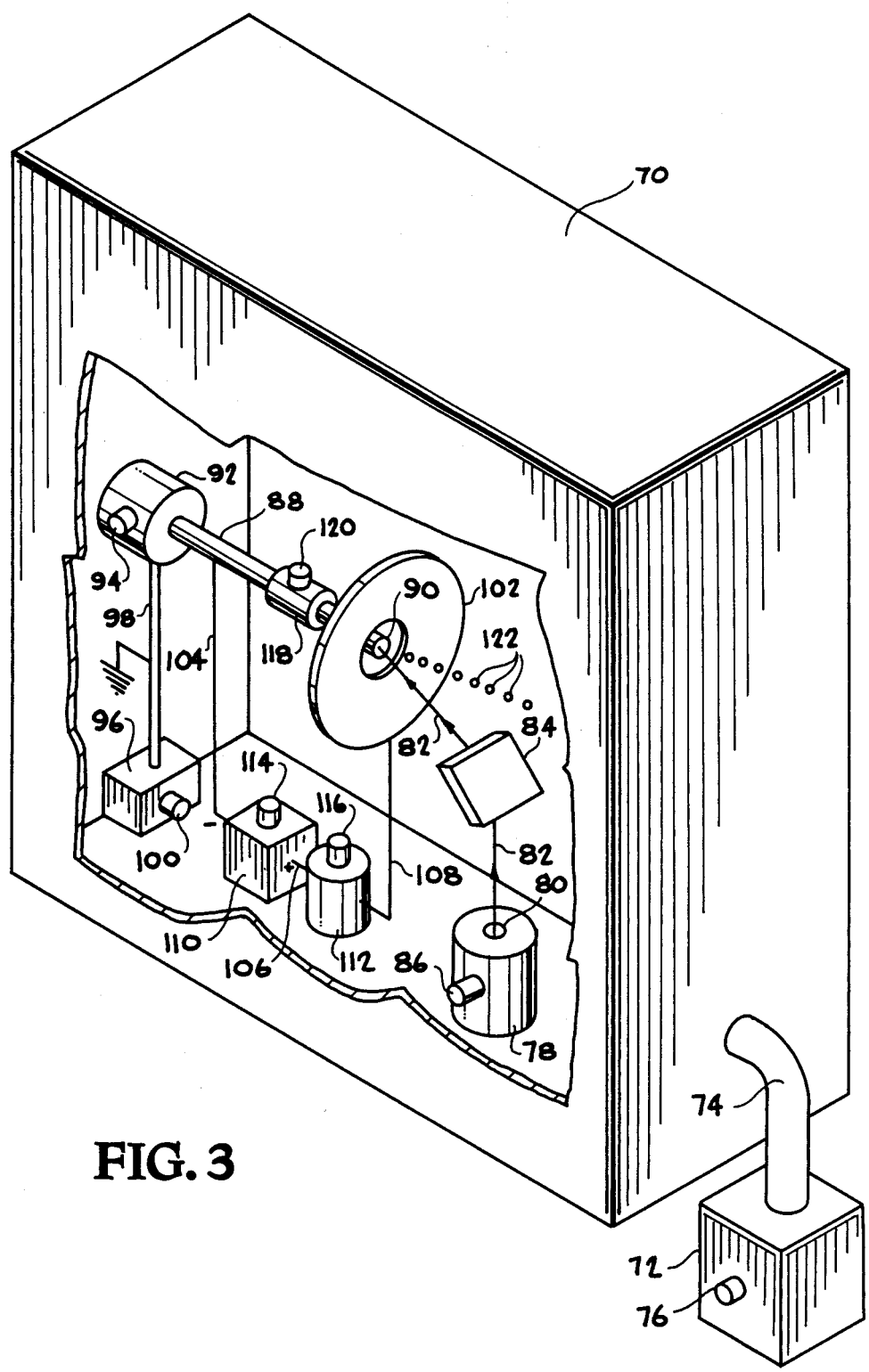
FIG. 3 is a schematic perspective view of an embodiment of apparatus for producing solid or hollow spherical particles having a uniform and controlled size distribution, in accordance with the method of this invention.

Reference is finally made to FIG. 3, which is a schematic perspective drawing of the presently preferred embodiment of the invention, for producing solid or hollow spherical particles having a uniform and controlled size distribution. The apparatus functions within a controlled environment provided by a hollow housing 70, the interior atmosphere and pressure of which are controlled by an environmental apparatus 72 that communicates with housing 70 via a pipe 74, schematically indicated. Also schematically indicated is an environmental control knob 76 for environmental apparatus 72. In practice, environmental apparatus 72 could be a vacuum pump or means for producing an inert atmosphere, such as a turbomolecular high vacuum pump, a diffusion pump, or a standard regulator and gas supply bottles, all of which are very well known. Means for producing controlled atmospheres or vacuums within confined spaces are very well-known in the mechanical, electrical and chemical arts, and the environment within housing 70 of the present invention may be controlled by any appropriate means. A laser 78 equipped with a focusing element 80, shown located within housing 70, produces a focused beam of laser light 82. However, in other embodiments of the invention, laser beam 82 could be produced at any convenient location external to housing 70, and introduced into the interior of housing 70 by any appropriate means such as, for example, through a transparent window, not shown. Laser 78 is of the same type as lasers 10 and 40, of FIGS. 1 and 2, respectively, and the description of laser 10, supra, is equally applicable to laser 78. As schematically represented, laser beam 82 may be reflected and redirected by any convenient means such as, for example, by a mirror 84. The power output of laser 78 is controlled by laser control knob 86, schematically indicated. A solid or hollow rod 88, having an end 90, is shown being introduced into laser beam 82, which has sufficient power to melt the rod material. Rod 88 if solid is exactly similar to rod 20 of FIG. 1, and if hollow is exactly similar to rod 48 of FIG. 2, both as described above. Rod 88 is supported by a rod support 92, which also introduces the end 90 of rod 88 into laser beam 82. The rate at which rod end 90 is introduced into laser beam 82 is controlled by rod support control knob 94, schematically indicated. Apparatus for supporting a rod and advancing it at a controlled rate is very well-known in the prior art. In situations where rod 88 is hollow, its interior is pressurized by a pressure source 96 and a connecting tube 98, which are exactly similar to pressure source 52 and connecting tube 54, as described above in relation to FIG. 2. In the present embodiment, pressure source 96 is schematically shown as provided with a pressure control knob 100. If rod 88 is solid, source 96 is merely inactivated. Rod 88 is attached to an electrode 102, schematically represented as an annular disk, via a first conductor 104, a power supply 110, a second conductor 106, a high-frequency generator 112, and a third conductor 108, that are connected in electrical series. Conductor 104 is grounded, as shown. Power supply 110 is exactly similar to power supply 28 as described above in relation to FIG. 1. with tne polarity shown, power supply 110 causes rod 88 to be at a negative electrical potential with respect to electrode 102, so that an electric field, in the range of from zero to $10^8$ volts per meter, is produced that is directed into rod end 90. However, in other embodiments of the invention, the polarity of power supply 110 may be opposite to that shown. The actual voltage provided by power supply 110 is controlled by power supply control knob 114, schematically indicated. The purpose of high-frequency generator 112 is to add, at a controlled frequency and intensity, a high-frequency component to the electric field that is directed into rod end 90. The frequency and output voltage of generator 112 are controlled by high-frequency generator control knob 116, schematically indicated. High-frequency generator 112 is of a type that is well-known in the prior art and is commonly commercially available, for example, as Hewlett-Packard Model 5205, or John Fluke Mfg. Co. Model 3100L, which cover the frequency range from zero to 100 MHz at power levels up to more than 200 watts. Finally, rod 88 is shown provided with a vibrator 118, the purpose of which is to vibrate rod end 90. Preferably, vibrator 118 is either a piezoelectric vibrator or a magnetostrictive vibrator, and is exactly similar to vibrator 58 that is described above in relation to FIG. 2. And, as in the previous case, vibrator 118 may be a vibrating device such as an audio speaker or a gas driven sonic generator or whistle. Vibrator 118 is shown provider with a vibrator control knob 120, schematically indicated. A stream of solid or hollow particles of uniform and controlled size distribution, and of the same chemical composition as rod 88, is shown leaving molten rod end 90.

The apparatus depicted in FIG. 3 may be used to perform the method of this invention and economically produce commercially large quantities of high melting solid or hollow spherical particles having a uniform and controlled size distribution and chemical composition. Solid or hollow rod 88 is introduced into laser beam 82 so that the end of the rod, 90, is made molten. This preliminary procedure is central to all aspects to the invention. After this, if rod 88 is hollow and pressurized by pressure source 96, by simply vibrating rod end 90, relatively large spherical hollow particles will be produced. On the other hand, if rod 88 is solid, by only energizing electrode 102 with power supply 110, so that an electric field is applied to rod end 90, small solid spherical particles will be produced. Application of further steps of the inventive method serve to control the uniformity of the produced particles. For example, working with either a solid or a hollow and pressurized rod 88, both vibrating and applying an electric field to molten rod end 90 will result in the controlled production of solid or hollow, respectively, spherical particles. Beyond this, additional steps can be taken to further improve the control of the uniformity and size distribution of the produced particles. These are as follows. The internal pressure of rod 88, when hollow, may be controlled by knob 110 of pressure source 96. The rate at which rod 88 is introduced into laser beam 82 may be controlled by knob 94 of rod support 92. The amplitude and frequency of vibration of molten rod end 90 may be controlled by knob 120 of vibrator 118. The direction of the electric field applied to molten rod end 90 may be controlled by the polarity of power supply 110; and the intensity of that electric field may be controlled by knob 114 of power supply 110. Further, as a part of this invention, the uniformity of the size distribution of produced solid or hollow spherical particles may be controlled by adding a controlled high-frequency component to the electric field applied to molten rod end 90. This high-frequency electric field component may be produced by high-frequency generator 112, which is controlled by knob 116 so that the frequency and intensity of the electric field may be controlled. In various applications of the inventive method of this invention, any or all—and in any combination—of these additional steps may be taken. Factors determinative of which of these additional steps should be taken are, inter alia, the specific nature of the material of which rod 88 consists, the dimensions of rod 88, the desired dimensions of particles 122, precisely just how monodisperse the size distribution of particles 122 should be, and the desired rate of production of particles 122. In practice, once apparatus as depicted in FIG. 3 is constructed, and experience is obtained in working with the method of this invention in a spectrum of various situations, it will become a straightforward matter to establish the exact operating parameters of any specific application of the invention.

It is thus appreciated that in accordance with the invention as herein described and shown in FIGS. 1 to 3, an economical method for producing commercially large quantities of high melting point solid or hollow spherical particles of a predetermined chemical composition and having a uniform and controlled size distribution is provided.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A method for producing hollow spherical particles consisting of a material, from a hollow rod that also consists of said material, the method comprising the steps of:

internally pressurizing said rod;

introducing an end of the pressurized rod into a focused beam of laser light having sufficient power to melt said material at said end of said pressurized rod; and Vibrating said end of said pressurized rod to produce hollow spherical particles from the melted material.

2. The method of claim 1, wherein the vibrating step is carried out with piezoelectric means.

3. The method of claim 1, wherein the vibrating step is carried out with magnetostrictive means.

4. The method of claim 1, wherein the vibrating step is carried out with an audio speaker.

5. The method of claim 1, wherein the vibrating step is carried out with a gas driven sonic generator or whistle.

6. The method of claim 1, carried out in a controlled environment.

7. The method of claim 1, further comprising the step of:

applying an electric field to said end of said rod.

8. The method of claim 7, wherein the direction of said electric field is into said end of said rod.

9. The method of claim 7, further comprising the step of:

adding a high-frequency component to said electric field.

10. A method for producing hollow spherical particles consisting of a material and having a uniform and controlled size distribution, from a hollow rod that also consists of said material, the method comprising the steps of:

internally pressurizing, to a controllable pressure, said hollow rod;

introducing, at a controllable rate and in a controlled environment, an end of the pressurized rod into a focused beam of laser light having sufficient power to melt said material at said end of said pressurized rod;

vibrating, at a controllable frequency and amplitude, said end of said pressurized rod;

applying, at a controllable intensity, an electric field to said end of said pressurized rod, with the direction of said electric field being into said end of said pressurized rod;

adding, at a controllable frequency and intensity, a high-frequency component to said electric field; and controlling said internal pressure, said rate, said environment, said vibration frequency and amplitude, said electric field intensity, and said high-frequency component frequency and intensity, so that said hollow spherical particles having a uniform and controlled size distribution are produced from the melted material.

* * * * *